United States Patent
Eberwine et al.

(10) Patent No.: US 10,257,706 B2
(45) Date of Patent: Apr. 9, 2019

(54) ELECTRONIC CREDENTIAL MANAGEMENT SYSTEM

(71) Applicant: Schlage Lock Company LLC, Indianapolis, IN (US)

(72) Inventors: Todd Eberwine, Golden, CO (US); Jeffrey Scott Neafsey, Arvada, CO (US); Jon P. Torre, Superior, CO (US); Donald Lee Beene, Noblesville, IN (US); Hamid Abouhashem, Lafayette, CO (US); Michelle Vickrey, Indianapolis, IN (US); Andrew Oliver, Littleton, CO (US)

(73) Assignee: Schlage Lock Company LLC, Carmel, IN (US)

( * ) Notice: Subject to any disclaimer, the term of this patent is extended or adjusted under 35 U.S.C. 154(b) by 205 days.

(21) Appl. No.: 14/728,701

(22) Filed: Jun. 2, 2015

(65) Prior Publication Data

US 2015/0350913 A1  Dec. 3, 2015

Related U.S. Application Data (60) Provisional application No. 62/006,836, filed on Jun. 2, 2014.

(51) Int. Cl.
*H04W 12/08* (2009.01)
*H04W 12/04* (2009.01)
(Continued)

(52) U.S. Cl.
CPC ............ *H04W 12/08* (2013.01); *G06Q 20/32* (2013.01); *G06Q 20/382* (2013.01);
(Continued)

(58) Field of Classification Search
CPC ..... H04W 12/08; H04W 12/04; H04W 12/06; G06Q 20/32; G06Q 20/382; G06Q 20/3821; G06Q 20/3829; H04L 63/0435
See application file for complete search history.

(56) References Cited

U.S. PATENT DOCUMENTS 5,612,683 A * 3/1997 Trempala ........... G07C 9/00015
340/5.23
6,885,738 B2 * 4/2005 White ................. H04M 11/007
379/102.06
(Continued)

FOREIGN PATENT DOCUMENTS

CN     101002420 A     7/2007
CN     101482987 A     7/2009
(Continued)

OTHER PUBLICATIONS

International Search Report; International Searching Authority; International PCT Application No. PCT/US2015/033802; dated Oct. 26, 2015; 4 pages.
(Continued)

*Primary Examiner* — Kambiz Zand
*Assistant Examiner* — Tongoc Tran
(74) *Attorney, Agent, or Firm* — Taft Stettinius & Hollister LLP (57) ABSTRACT

A system and method for the management of electronic credentials stored on mobile devices. The system may encrypt information that is provided to a lock device and an access control system using diversification keys. The diversification keys may be generated by supplying a master key and a component identifier such as, for example, a mobile device identifier, to a diversification algorithm. The mobile device may be a conduit for the communication of information between the access control system and the lock device. The mobile device may be unable to decrypt infor-
(Continued)

mation that has been encrypted by a diversification key. Embodiments also provide for enrolling administrative mobile devices with the access control system, the distribution and revocation of credential identifiers for user mobile device, and removing administrative mobile devices that are enrolled with lock devices.

20 Claims, 7 Drawing Sheets

(51) Int. Cl.
*H04W 12/06* (2009.01)
*H04L 29/06* (2006.01)
*G06Q 20/32* (2012.01)
*G06Q 20/38* (2012.01)

(52) U.S. Cl.
CPC ..... *G06Q 20/3821* (2013.01); *G06Q 20/3829* (2013.01); *H04L 63/0435* (2013.01); *H04W 12/04* (2013.01); *H04W 12/06* (2013.01)

(56) References Cited

U.S. PATENT DOCUMENTS

| | | | |
|---|---|---|---|
| 6,971,016 B1 | 11/2005 | Barnett | |
| 7,012,503 B2* | 3/2006 | Nielsen | G07C 9/00103 340/5.6 |
| 8,482,378 B2* | 7/2013 | Sadighi | G07C 9/00103 340/5.2 |
| 8,521,809 B2 | 8/2013 | Arnold et al. | |
| 8,689,297 B2 | 4/2014 | Pasquero et al. | |
| 8,712,394 B2 | 4/2014 | Bos | |
| 2002/0180582 A1 | 12/2002 | Nielsen | |
| 2003/0122651 A1* | 7/2003 | Doi | G07C 9/00182 340/5.7 |
| 2004/0219903 A1* | 11/2004 | Despain | G07C 9/00023 455/410 |
| 2007/0176739 A1* | 8/2007 | Raheman | H04W 12/04 340/5.64 |
| 2007/0271596 A1* | 11/2007 | Boubion | G06F 21/35 726/3 |
| 2010/0141381 A1* | 6/2010 | Bliding | G07C 9/00309 340/5.61 |
| 2010/0176919 A1* | 7/2010 | Myers | G07C 9/00571 340/5.73 |
| 2011/0176451 A1* | 7/2011 | Uchida | G06Q 10/10 370/252 |
| 2011/0300840 A1* | 12/2011 | Basir | G10L 15/265 455/416 |
| 2012/0172018 A1* | 7/2012 | Metivier | G07C 9/00309 455/414.1 |
| 2013/0342314 A1 | 12/2013 | Chen et al. | |
| 2014/0002236 A1* | 1/2014 | Pineau | G06F 21/32 340/5.6 |
| 2014/0018040 A1* | 1/2014 | Kim | H04W 12/06 455/411 |
| 2014/0025958 A1 | 1/2014 | Calman | |
| 2014/0040628 A1* | 2/2014 | Fort | G06F 21/34 713/182 |
| 2014/0049363 A1 | 2/2014 | Ahearn et al. | |
| 2014/0109631 A1* | 4/2014 | Asquith | E05B 45/005 70/15 |
| 2014/0245254 A1* | 8/2014 | Padmalata | G06Q 10/00 717/104 |
| 2015/0026343 A1* | 1/2015 | Borges | H04L 67/10 709/226 |
| 2015/0318998 A1* | 11/2015 | Erlikhman | H04L 9/32 713/171 |
| 2017/0111351 A1* | 4/2017 | Grajek | H04L 63/0815 |

FOREIGN PATENT DOCUMENTS

| | | |
|---|---|---|
| CN | 101971186 A | 2/2011 |
| WO | 2013123079 A1 | 8/2013 |

OTHER PUBLICATIONS

Written Opinion; International Searching Authority; International PCT Application No. PCT/US2015/033802; dated Oct. 26, 2015; 7 pages.
Chinese Search Report; State Intellectual Property Office, Peoples Republic of China; Chinese Patent Application No. 201580039657.1; dated Aug. 24, 2018; 5 pages.
Chinese Office Action; State Intellectual Property Office, Peoples Republic of China; Chinese Patent Application No. 201580039657.1; dated Sep. 3, 2018; 18 pages.
Hidchina, HID Global expansion iCLASS SE platform, newly added iCLASS Seos credential card and support to "Open Shop Directory Project", retrieved on Aug. 23, 2018, 4 pages, http://blog.sina.com.cn/blog_6f1b5970101a5db.html.
Extended European Search Report; European Patent Office; European Patent Application No. 15802702.9; dated Oct. 19, 2017; 13 pages.
NXP B.V.; AN10922 Symmetric Key Diversifications; Mar. 17, 2010; 23 pages.
Mexican Official Action (First); Mexican Patent Office; Mexican Patent Application No. MX/a/2016/016008; dated May 30, 2018; 5 pages.
Canadian Office Action; Canadian Intellectual Property Office; Canadian Patent Application No. 2,954,758; dated Aug. 3, 2017; 5 pages.

* cited by examiner

ELECTRONIC CREDENTIAL MANAGEMENT SYSTEM

CROSS REFERENCE TO RELATED APPLICATIONS

The present application claims the benefit of U.S. Provisional Patent Application No. 62/006,836 filed on Jun. 2, 2014, the contents of which are hereby incorporated by reference in their entirety.

BACKGROUND

Embodiments of the present application generally relate to electronic credential management for lock systems. More specifically, embodiments of the present invention relate to the secure distribution and management of electronic credentials.

Credentials used to manage the operation of lock systems are often physical in nature such as, for example, being at least part of a card, fob, token, or mobile device to be read at a lock device. Thus, current credential systems typically require that the interaction between the credential and the lock device occur at, or at least near, the lock device. For example, when interaction between the credential and lock device is needed, a user may need to swipe a credential containing card through, or present the credential near, a card reader associated with the lock device.

Similarly, when a new credential is being added to a lock system, the credential typically needs to be received by, and/or otherwise be in the possession of, a user. The user may then need to manually add the credential to the system such as, for example, by presenting the physical form of the credential at the actual location of each lock device in the lock system that is to be associated with the credential. With the physical credential presented at the location of the lock device(s), the credential may be manually added to an access control portion of the lock device.

BRIEF SUMMARY

An aspect of the present invention is directed to a method for credential management that includes inputting a master key and a mobile device identifier into a diversification algorithm to generate a diversification key, the mobile device identifier including information that identifies a mobile device. Further, a control system payload is encrypted using the diversification key, the control system payload including at least one or more unique credential identifiers. An access control system may communicate the encrypted control system payload to the mobile device. Additionally, a lock device receives the encrypted control system payload from the mobile device and may retrieve the master key from a memory of the lock device. The lock device may also decrypt the encrypted control system payload using the retrieved master key and the mobile device identifier.

Another aspect of the present invention is directed to a method for managing a system that includes receiving, by an access control system, a mobile device identifier from a mobile device. The mobile device identifier and a master key are applied to a diversification algorithm to generate a diversification key, with the diversification key being used to encrypt a mobile device payload that includes one or more credential identifiers. Additionally, the one or more credential identifiers may include information regarding a permission level of the mobile device. The access control system may communicate the encrypted mobile device payload to the mobile device. Further, a lock device may receive the encrypted mobile device payload from the mobile device. The lock device may also decrypt the encrypted mobile device payload and extract the one or more credential identifiers from the decrypted encrypted mobile device payload. Additionally, the lock device may identify the permission level of the mobile device using the extracted one or more credential identifiers and determine, using the identified permission level, whether the mobile device has authority to complete an action.

Additionally, an aspect of the present invention is directed to a method for revocation of one or more credential identifiers stored on a mobile device. The method includes communicating, by the access control system, a first credential identifier for storage on the mobile device. An encrypted revocation request payload may also be received by a lock device, the encrypted revocation request payload including a second credential identifier that is related to the first credential identifier. The lock device may decrypt the encrypted revocation request payload and extract the second credential identifier from the decrypted encrypted revocation request payload. The lock device may also identify the second credential identifier as being a revoked identifier. Additionally, the lock device may receive a communication from the mobile device that includes the first credential identifier. The lock device may further identify whether the received first credential identifier is related to the revoked identifier.

A further aspect of the present invention is directed to a method for revocation of credential identifiers stored on a mobile device, the method including communicating, by an access control system, a credential identifier for storage on the mobile device and communicating, by the access control system, a revocation request to the mobile device. The revocation request may request that the stored credential identifier be removed from the mobile device. The method may further include the access control system receiving a notification that the stored credential identifier has been removed from the mobile device.

Another aspect of the present invention is directed to a method for removing an administrative mobile device from an enrolled lock device that includes notifying an access control system that a first administrative mobile device is being removed from the access control system. Additionally, a replacement administrative mobile device may be enrolled with the access control system, and a field device reset may be performed on the enrolled lock device of the of a credential management system. An encrypted lock device payload may be received by the access control system, the encrypted lock device payload including a replacement field device reset identifier. The access control system may extract from the encrypted lock device payload the replacement field device reset identifier, and communicate the extracted replacement field device reset identifier to one or more user mobile devices that are to be used with the enrolled lock device.

Other aspects of the present invention will become apparent by consideration of the detailed description and accompanying drawings.

The foregoing summary, as well as the following detailed description of certain embodiments of the present invention, will be better understood when read in conjunction with the appended drawings. For the purpose of illustrating the invention, there is shown in the drawings, certain embodiments. It should be understood, however, that the present invention is not limited to the arrangements and instrumentalities shown in the attached drawings.

DESCRIPTION OF THE ILLUSTRATED EMBODIMENTS

Figure 1:
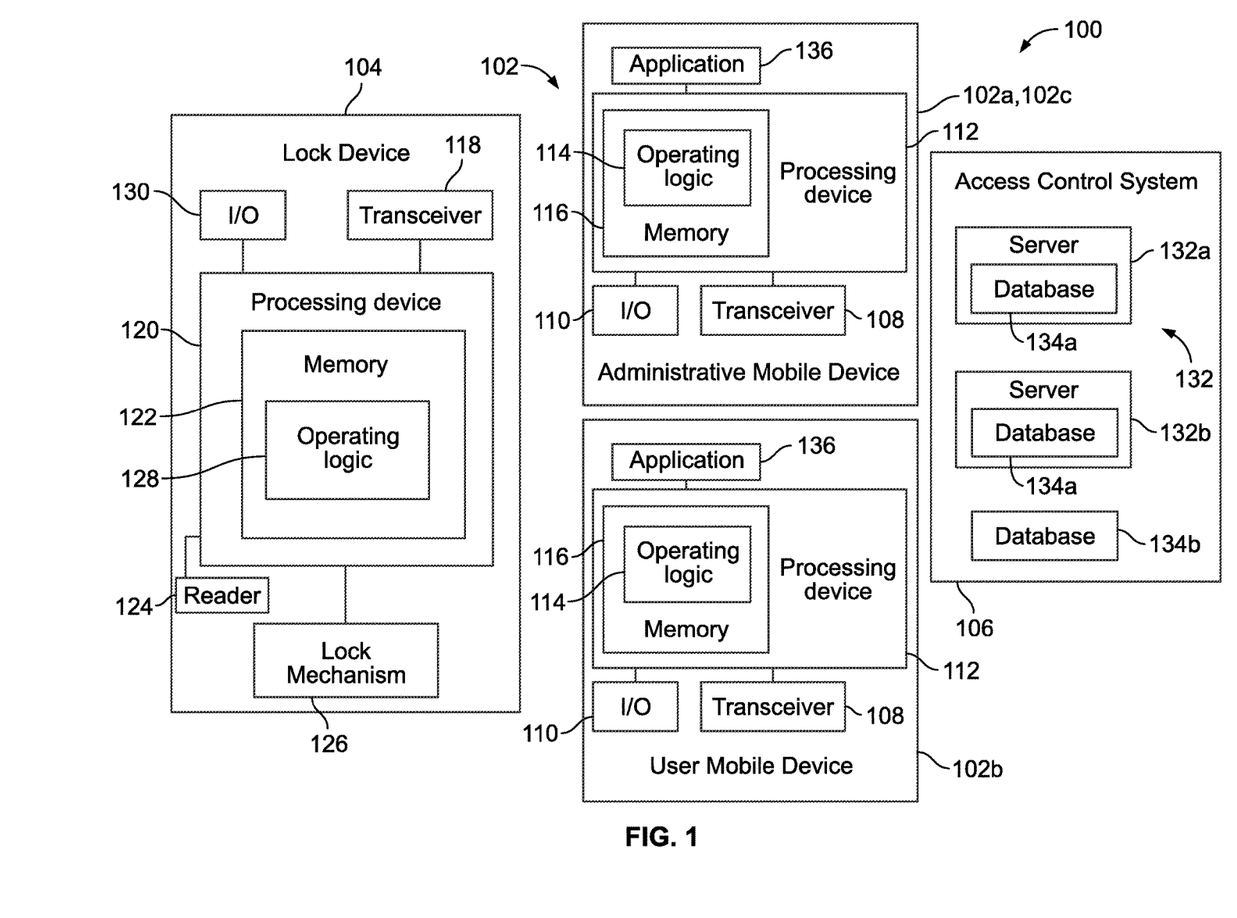
FIG. 1 illustrates a schematic diagram of an exemplary system that includes one or more mobile devices, one or more lock devices, and an access control system according to an illustrated embodiment of the present invention.

FIG. 1 illustrates a schematic diagram of an exemplary system 100 that includes one or more mobile devices 102, one or more lock devices 104, and an access control system 106 according to an illustrated embodiment of the present invention. A variety of mobile devices 102 may be utilized, including, for example, a mobile telephone, smartphone, tablet, personal computing device, and/or a proprietary hand-held device, among other devices. According to the illustrated embodiment, the mobile device 102 may have one or more transceivers 108 for communicating data with other devices, including the lock device 104 and the access control system 106. Additionally, a variety of different types of transceivers 108 may be used, including, for example, active and passive transceivers that may communicate via Bluetooth (including Bluetooth low energy) and/or WiFi. The mobile device 102 may also include an input/output device 110 such as, for example, a keypad, display, and/or touch screen among other input/output devices. Additionally, the mobile device 102 may include may include one or more different processing devices 112 such as, for example, programmable, dedicated, and/or hardwired state machine types of processors, as well as any combination thereof. For example, according to certain embodiments, the processing device 112 may include multiple processors and may be of a programmable variety that executes algorithms and processes data in accordance with an operating logic 114 as defined by programming instructions (such as software or firmware) stored in a memory 116.

As discussed in further detail below, in the illustrated embodiment, an administrative mobile device 102a may be granted authority or a permission level in connection with administrative tasks relating to managing and/or configuring the lock devices 104 of the system 100, while user mobile devices 102b may be configured for general use of the lock devices 104 such as, for example, at least day-to-day routine operation or use of the lock devices 104.

The lock device 104 may be a lock, reader device, a payment terminal, and/or any other type of device that can communicate with the mobile device 102. For example, in the embodiment shown in FIG. 1, the lock device 104 is an electronic lock device having one or more transceivers 118, a processing device 120, a memory 122, a reader 124, and a lock mechanism 126 such as, for example, a bolt and/or latch. The memory 122 may or may not be part of the processing device 120. The mobile device 102 and the lock device 104 may be adapted to communicate with each other using one or more of a variety of different wireless communication technologies. For example, according to certain embodiments, the lock device 104 may have a transceiver 118 that allows for Bluetooth low energy communication between the mobile device 102 and the lock device 104. Further, according to certain embodiments, the mobile device 102 and the lock device 104 may communication via NFC and/or WiFi (such as WiFi Direct).

A variety of different types of processing devices may be employed for the processing device 120 of the lock device 104 such as, for example, a programmable, dedicated, and/or hardwired state machine, or any combination thereof. The processing device 120 may further include multiple processors such as, for example, Arithmetic-Logic Units (ALUs), Central Processing Units (CPUs), Digital Signal Processors (DSPs), or the like. Processing devices 120 with multiple processing units may also utilize distributed, pipelined, and/or parallel processing. The processing device 120 may also be dedicated to the performance of just the operations described herein, or may be utilized in one or more additional applications. In the depicted form, the processing device 120 is of a programmable variety that executes algorithms and processes data in accordance with operating logic 128 as defined by programming instructions (such as software or firmware) stored in the memory 122 of the lock device 104. Alternatively or additionally, the operating logic 128 is at least partially defined by hardwired logic or other hardware. The processing device 120 may include one or more components of any type suitable to process the signals received from an input/output device 130 of the lock device 104 such as, for example, the keypad, reader 124, or elsewhere, and to provide desired output signals. Such components may include digital circuitry, analog circuitry, or a combination of both.

The memory 122 of the lock device 104 may be included with the processing device 120 and/or coupled to the processing device 120. Further, the memory 122 may be of one or more types, such as a solid-state variety, electromagnetic variety, optical variety, or a combination of these forms. Additionally, the memory 122 can be volatile, nonvolatile, or a combination of these types, and some or all of the memory 122 can be of a portable variety, such as a disk, tape, memory stick, cartridge, or the like. In addition, according to certain embodiments, the memory 122 can store data that is manipulated by the operating logic 128 of processing device 120, such as data representative of signals received from and/or sent to the input/output device 130 in addition to, or in lieu of, storing programming instructions defining the operating logic 128.

The access control system 106 may include one or more servers 132 such as, for example, a cloud-based server and/or a web-based server, that may communicate with the mobile device 102 and/or the lock device 104 in a variety of different manners including, for example, over the Internet, a cellular data network, or any combination thereof. Further, according to certain embodiments, different servers 132 may be used for different purposes such as, for example, a cloud-based server 132a for installation, maintenance, and/or management of, or relating to, the access control system 106, lock device 104, and/or the mobile device 102, and another, different server 132b such as, for example, a web-based server, for other purposes such as, for example, general day-to-day usage and/or operation of the lock device 104. The access control system 106 may also include one or more databases 134 or other record systems. A variety of different types and combination of types of databases 134 may be utilized. For example, the one or more servers 132 may include databases 134a and/or be in operable communication with auxiliary databases such as, for example, auxiliary databases 134b for a manufacturer, producer, and/or assembler of the lock device 104.

Figure 2A:
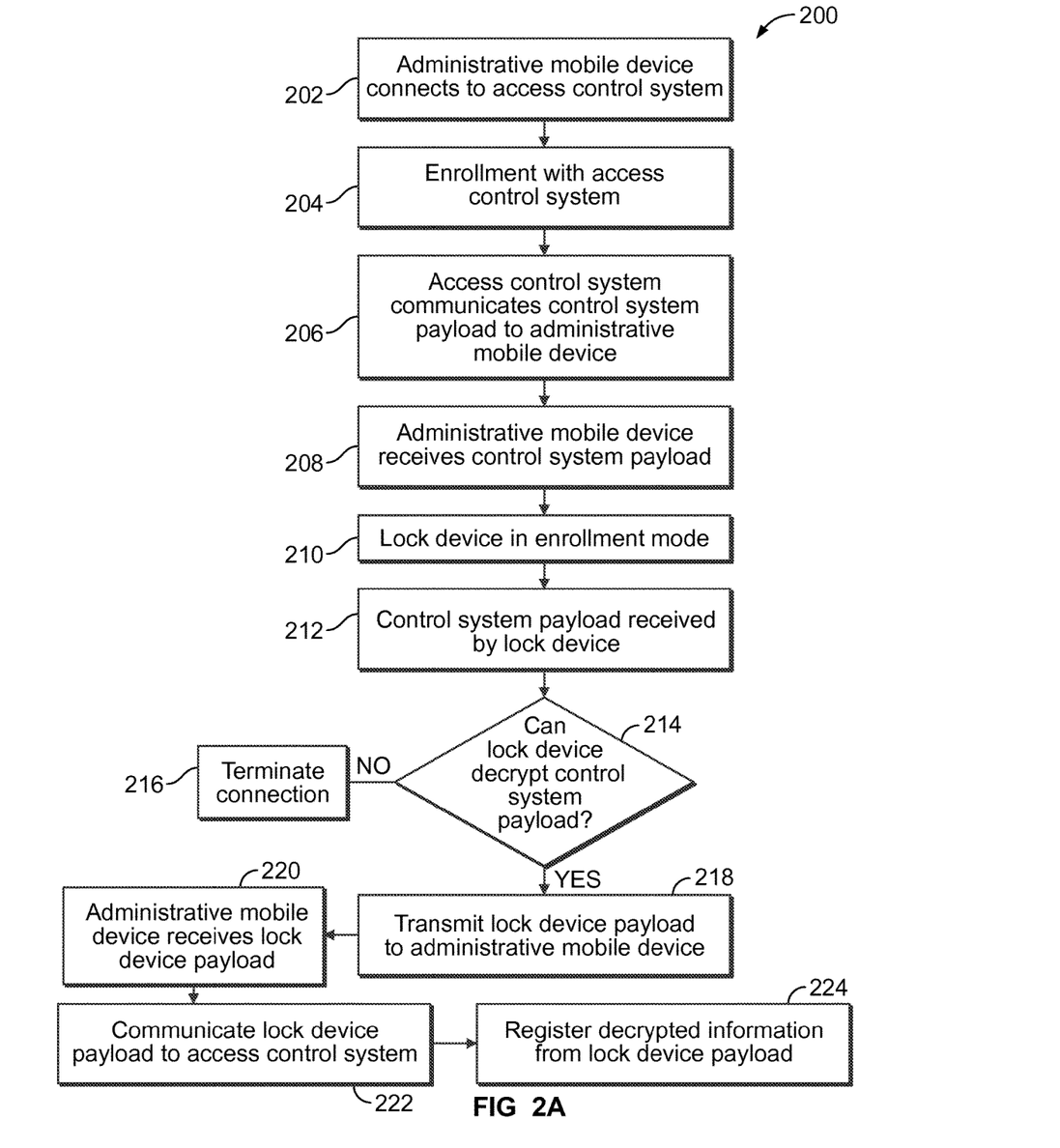
FIG. 2A illustrates a flow diagram of an exemplary process for enrolling an administrative mobile device and lock device with the access control system according to an illustrated embodiment of the present invention.
Figure 2B:
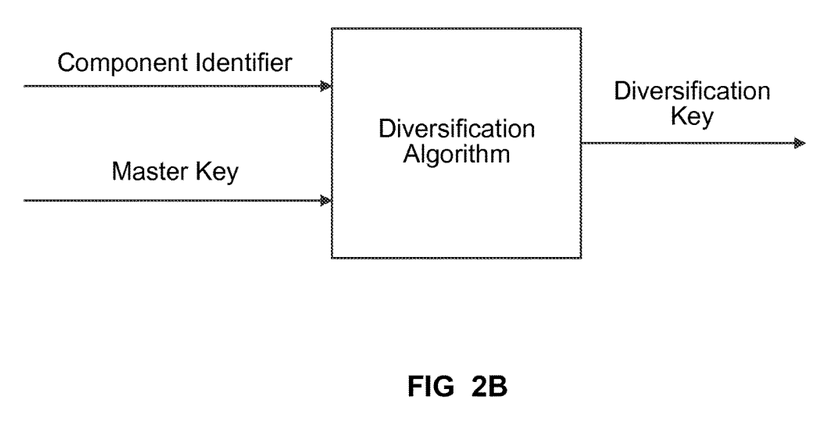
FIG. 2B illustrates a schematic representation for generating a diversification key using the diversification algorithm, a master key, and an identifier of an administrative mobile device, user mobile device, and/or lock device.

FIG. 2 illustrates a flow diagram of an exemplary process 200 for enrolling an administrative mobile device 102a and lock device 104 with the access control system 106 according to an illustrated embodiment of the present invention. At step 202, the administrative mobile device 102a connects to the access control system 106 such as, for example, by connecting to a server 132 so that communications may be transmitted between, and received by, the administrative mobile device 102a and the access control system 106. At step 204, the user may enroll in, or otherwise access, a registered user account with the access control system 106. For example, the user of the mobile administrative mobile device 102a may enter various different types of information into the access control system 106 including, for example, information relating to the user or an associated institution, the administrative mobile device 102a, and/or the lock device(s) 104 associated with the user/institution, among other information. The control access system 106 may then enroll the user and/or the administrative mobile device 102a that is associated with the registered user account. At step 206, the access control system 106 will communicate a control system payload to the administrative mobile device 102a. The control system payload may contain a variety of different types of information such as, for example, one or more unique credential identifiers, access permissions, and/or a configuration permission. Additionally, the access control system 106 may encrypt the control system payload using an administrative diversification key. As shown by FIG. 2B, according to certain embodiments, the administrative diversification key may be generated by applying at least a master key which may be known by the access control system 106 and the lock device 104, but not the administrative mobile device 102a, and an administrative mobile device identifier such as, for example, a serial number, production code, product number, and/or universal unique identifier (UUID) of the administrative mobile device, among other identifiers, to a diversification algorithm. Further, as discussed below, diversification keys for other components of the system 100 may also be generated in a similar manner such as, for example, supplying the master key and an identifier associated with the particular component such as, for example, a mobile device 102 or lock device 104, to the diversification algorithm to generate the associated diversification key. At step 208, the administrative mobile device 102a receives the communicated control system payload.

With the administrative mobile device 102a enrolled with the access control system 106, the administrative mobile device 102a may be presented to the lock device 104. Therefore, at step 210, the lock device 104 may be put into an enrollment mode such as, for example, via receipt of a communication by the processing device 120 the lock device 104 such as, for example, a communication made via entry of code into a keypad of the input/output device 130, recognition of data by card reader of the lock device 104, an enrollment credential, or communication from the administrative mobile device 102a to the transceiver 118 of the lock device 104. It is contemplated that a variety of operations may occur in connection with the lock device 104 being put into the enrollment mode such as, for example, the lock device 104 authenticating information received by the lock device 104 before the lock device 104 may enter into the enrollment mode. At step 212, with the lock device 104 in the enrollment mode, and a connection between the lock device 104 and the administrative mobile device 102a is established, the administrative mobile device 102a may be used in the communication of the encrypted control system payload from the administrative mobile device 102a to the lock device 104.

At step 214, using the master key contained in the memory 122 and/or an administrative mobile device identifier, the lock device 104 will attempt to decrypt the received control system payload. If the lock device 104 is unable to decrypt the control system payload, then at step 216, the connection between the lock device 104 and the administrative mobile device 102a is terminated. However, if the lock device 104 is able to decrypt the control system payload, then at step 218, the lock device 104 transmits a lock device payload to the administrative mobile device 102a. The lock device payload may include a variety of information such as, for example, a field device reset identifier and one or more lock device identifiers such as, for example, a lock device UUID, serial number, and/or a production code, among other types of identifiers. Additionally, the lock device payload may also be encrypted using the administrative diversification key. At step 220, the administrative mobile device 102a receives the communicated encrypted lock device payload from the lock device 104. According to certain embodiments, the administrative mobile device 102a may then have control of the lock device 104 via the access and configuration permissions provided by the access control system 106.

At step 222, the administrative mobile device 102a may communicate the lock device payload information to the access control system 106. At step 224, the access control system 106 may register, or otherwise record or store information received from the communicated lock device payload. Such registering may associate the received information from the lock device payload with the associated register user account and/or the lock device 104. For example, according to certain embodiments, the access control system 106 may register information from the lock device payload such as, for example, the one or more lock device identifiers such as, for example, a field device reset identifier, in a database 134. Additionally, the registering of the information may include recording the information in one or more databases 134a, 134b, or operably accessible to the server(s) 132 of the access control system 106.

By using the diversification algorithm in the manner described herein to generate, and use diversification keys, information encrypted within the payloads that are communicated between the lock device 104 and the access control system 106 may not be accessible to the mobile devices 102. Additionally, the inclusion of the identifiers relating to at least the mobile devices 102 in generating diversification keys may preclude and/or decrease the likelihood of success of the security of the system 100 being compromised by a playback attack.

Figure 3:
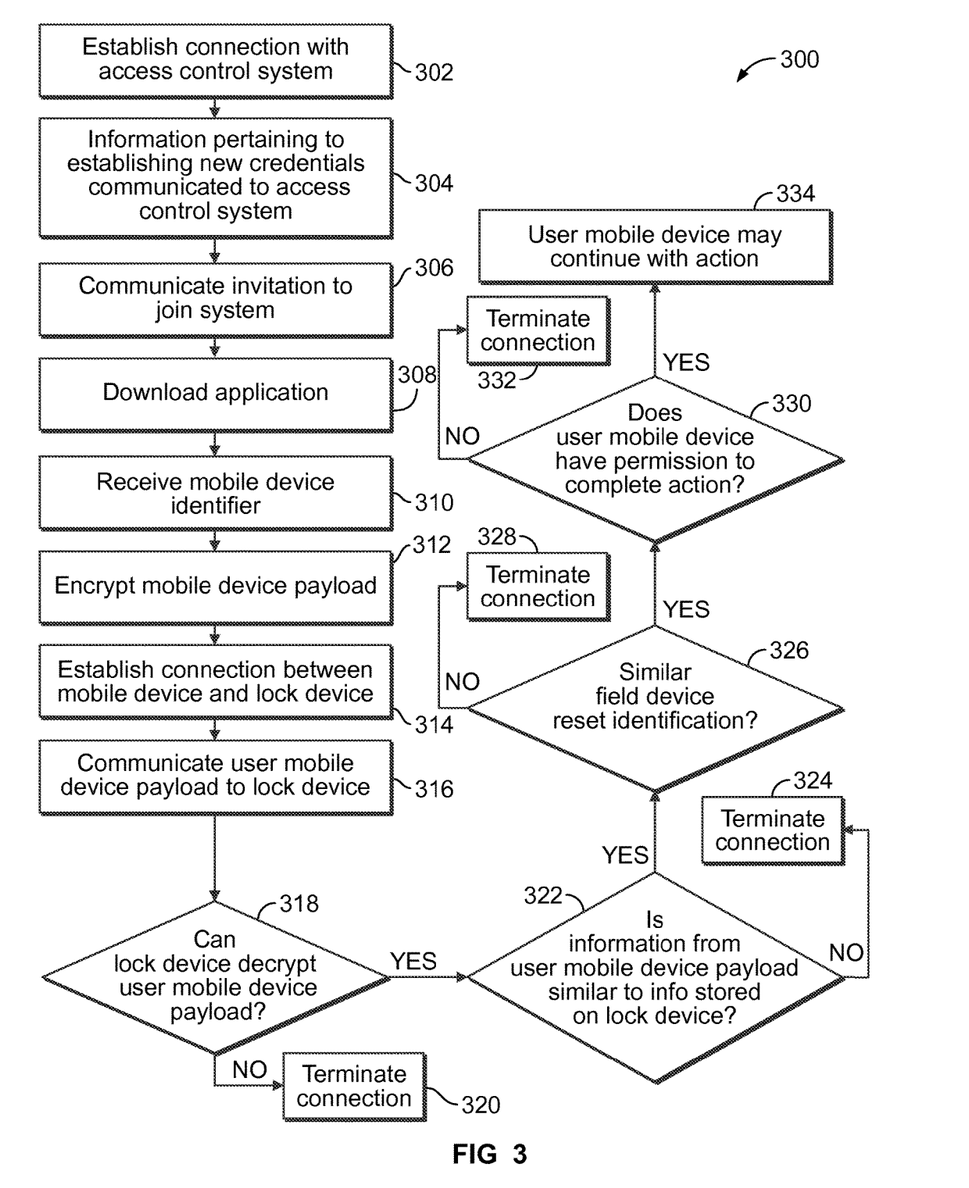
FIG. 3 illustrates a flow diagram of an exemplary process for creating and distributing credential identifiers to user mobile devices according to an illustrated embodiment of the present invention.

FIG. 3 illustrates a flow diagram of an exemplary process 300 for creating and distributing credential identifiers to user mobile devices 102b according to an illustrated embodiment of the present invention. Credential identifiers for user mobile devices 102b may be generated in a variety of manners including, for example, through use of an application 136 on the administrative mobile device 102a, or by accessing the access control system 106 via a web portal. For example, an application 136 that may be installed on the administrative mobile device 102a may process, receive and/or store data relating to/from the access control system 106, the administrative mobile device 102a, user mobile devices 102b, and/or the lock device 104. For example, according to certain embodiments, the application 128 may be used in connection with communicating information such as, for example, encrypted security and/or authentication information or data, via the administrative mobile device 102a to/from the access control system 106 and the lock device 104. Further, as discussed above, the application 136, and thus the administrative mobile device 102a, may not be configured to decrypt at least information that is passed along through the administrative mobile device 102a that is encrypted with a diversification key. Further, credential identifiers for mobile devices 104b, as well as for administrative mobile devices 104a, may be stored on the mobile devices 104a, 104b such as, for example, being stored by the application 136.

According to the illustrated embodiment, at step 302, the application 136 or a web portal may be used to establish an operable connection with the access control system 106. At step 304, using the connection, information pertaining to establishing new credential identifiers for a user of the system 100 may be communicated to the access control system 106. A variety of different types of information may be provided and/or selected for the new credential identifiers including, for example, a selection of the permission level or authorization that is to be given for the new credential. A variety of different permission levels may be offered for selection such as, for example, simple access, one-time access, the ability to request other new credential identifiers, and/or the ability to configure a lock device(s) 104, among other permissions. Additionally, the access control system 106 may be provided with identification information relating to the user mobile device 102b and/or the associated user such as, for example, contact information such as a phone number or email address associated with the user and/or user mobile device 102b, among other information.

At step 306, an invitation to join the system 100 from the access control system 106 and/or the administrative mobile device 102a may be communicated to the user mobile device 102b. According to certain embodiments, the invitation may be communicated to a phone number or email address associated with the user and/or the user mobile device 102b. The invitation may include a variety of information including, for example, an invitation to download an application 136 onto the user mobile device 102b and/or to register with the access control system 106. If the user elects to join the system 100, then at step 308, the application 136 may be downloaded to the user mobile device 102b, and the user may enroll in the access control system 106. At step 310, the access control system 106 may receive a user mobile device identifier such as, for example, a serial number, production code, product number, and/or universal unique identifier (UUID) for the user mobile device 102b, among other identifiers. According to certain embodiments, the user mobile device identifier may be communicated to the access control system 106 during the enrollment process at step 308.

At step 312, the access control system 106 may encrypt a user mobile device payload. For example, according to certain embodiments, the access control system 106 may encrypt the user mobile device payload using the master key and a user mobile device identifier. Moreover, according to certain embodiments, the access control system 106 may encrypt the user mobile device payload using the master key, a user mobile device identifier, and the diversification algorithm to generate the user diversification key. The encrypted user mobile device payload may include a variety of information including, for example, one or more user mobile device identifiers and other information needed for the user mobile device 102b to work with the lock device 104 including, for example, information indicating the permission level assigned to the user mobile device 102b, credential identifiers, a lock identifier, and/or a field device reset identifier, among other information. Further, according to illustrated embodiments, the encrypted user mobile device payload may be stored on the user mobile device 104b, thereby allowing for the associated credential identifiers to be stored in the user mobile device 104b.

At step 314, the user mobile device 102b may establish a connection with the lock device 104. With the connection established, at step 316 the user mobile device 102a can communicate the user mobile device payload to the lock device 104.

At step 318, using the master key contained in the memory 122 and/or one or more mobile device identifier(s), the lock device 104 will attempt to decrypt the received user mobile device payload such as, for example, decrypting the user mobile device payload that had been encrypted using the user diversification key. If the lock device 104 is unable to decrypt the user mobile device payload, then at step 320 the lock device 104 may deny the user mobile device 102b access to the lock device 104 and/or the connection between the lock device 104 and the user mobile device 102b is terminated. However, if the lock device 104 is able to decrypt the user mobile device payload then, according to certain embodiments, the user mobile device 102b is authorized to communicate with the lock device 104.

If the lock device 104 was able to decrypt the user mobile device payload, then at step 322 the lock device 104 may compare information that was encrypted in the user mobile device payload with information stored in or otherwise accessible to the lock device 104, including information or data stored in the memory 122 of the lock device 104. For example, the lock device 104 may compare one or more lock device identifiers that had been encrypted in the user mobile device payload with similar types of lock device identifiers that are stored in the memory 122 of the lock device 104. If the comparison indicates that the lock device identifiers from the decrypted user mobile device payload are not the same, similar, and/or related to lock device identifiers that are stored in the memory 122 of the lock device 104, then at step 324 the lock device 104 may terminate communication with the user mobile device 102b and/or deny the user mobile device 102b access to the lock device 104.

If the lock device identifiers in the decrypted user mobile device payload are the same, similar, and/or related to lock device identifiers that are stored in the memory 122 of the lock device 104, then at step 326 the lock device 104 may compare other information from the decrypted user mobile device payload with information stored in, or otherwise accessible to, the lock device 104 such as, for example, the field device reset identifier from the user mobile device payload with the field device reset identifier stored by the lock device 104. In such an example, if the compared field device reset identifiers are not the same, similar, and/or related, then at step 328 the lock device 104 may terminate communication with the user mobile device 102b and/or deny the user mobile device 102b access to the lock device 104. Further, such comparisons between field device reset identifiers may provide a level of security in the event the administrative mobile device 102a is lost or changed, since performing a field device reset will change the field device reset identifier on the lock device 104.

If, however, the comparison(s) performed at step 322 indicates that the compared information or data is the same, similar, and/or related, then at step 330 the lock device 104 may evaluate the permission level of the user mobile device 102b that was contained in the encrypted user mobile device payload and validate that the user mobile device 102b has the permission or authority to complete the action that the user mobile device 102b is attempting to complete. If the user mobile device 102b does not have permission or authority to complete the action, then at step 332 the lock device 104 may terminate communications with the user mobile device 102b and/or deny the user mobile device 102b access to the lock device 104. If, however, the lock device 104 determines that the user mobile device 102b is authorized to complete the action, then at step 334 communication between the lock device 104 and the user mobile device 102b may continue as needed to complete the authorized action.

Figure 4:
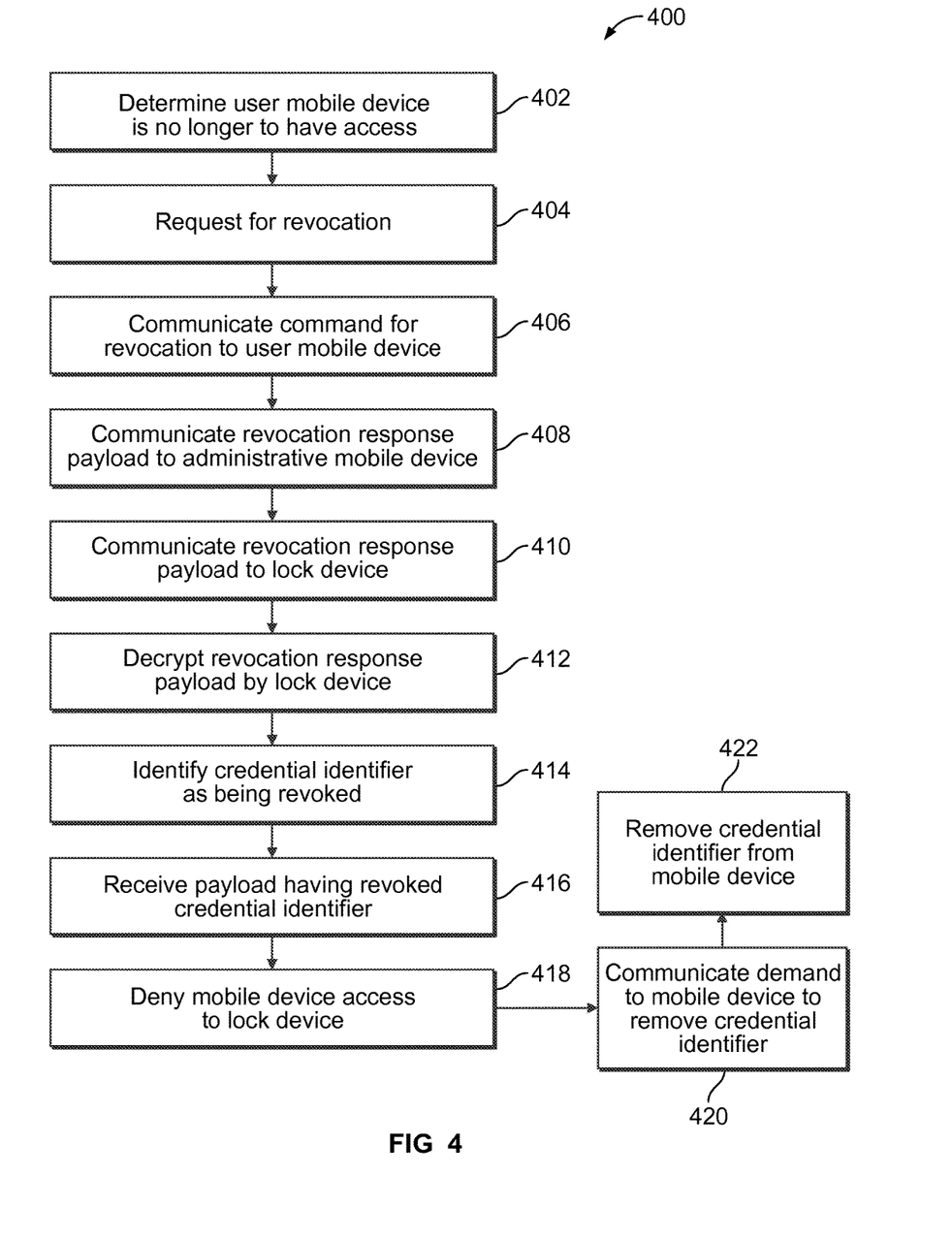
FIG. 4 illustrates a flow diagram of an exemplary process for manually revoking a credential identifier(s) for user mobile devices according to an illustrated embodiment of the present invention.

FIG. 4 illustrates a flow diagram of an exemplary process 400 for manually revoking a credential identifier(s) for user mobile devices 102b according to an illustrated embodiment of the present invention. At step 402, the administrative mobile device 102a may make a determination, or otherwise be instructed, that the user mobile device 102b is to no longer be allowed access to the lock device 104. At step 404, a request for revocation of the current credential identifier of the user mobile device 102b is generated. The request for revocation may be generated in a number of different ways. For example, according to certain embodiments, the request may be generated through use of the application on the administrative mobile device 102a, or via a web portal connection to the access control system 106.

At step 406, a command for revocation of the credential identifier of the user mobile device 102b is communicated to the user mobile device 102b. According to certain embodiments, the revocation command may be generated and communicated to the user mobile device 102b by the access control system 106, the administrative mobile device 102a, or a combination thereof. According to certain embodiments, the revocation command may be sent to an email address(es) or telephone number(s) associated with the user mobile device 102b.

At step 408, the access control system 106 may a communicate a revocation response payload to the administrative mobile device 102a. According to certain embodiments, the access control system 106 may send the revocation response payload to the administrative mobile device 102a regardless of whether the response has been received from the user mobile device 102b. The revocation response payload may contain a variety of information such as, for example, the credential identifier that is to be revoked along with information necessary for communication with the lock device 104, among other information. Additionally, the revocation response payload may be encrypted such as, for example, through use of the administrative diversification key, which may be generated by supplying the master key from the access control system 106 and one or more of the administrative mobile device identifiers to the diversification algorithm.

At step 410, the administrative mobile device 102a may communicate the revocation response payload to the lock device 104. According to certain embodiments, the revocation response payload may be communicated to the lock device 104 upon the establishment of the next, subsequent communication between the administrative mobile device 102a and the lock device 104. At step 412, the lock device 104 may decrypt the revocation response payload such as, for example, in a manner similar to those previously discussed. At step 414, upon determining that the revoked credential identifier is intended to be associated, at least in-part, with the lock device 104 that received the revocation response payload, that lock device 104 will identify the credential identifier as being revoked. For example, according to certain embodiments, the lock device 104 may assign the revoked credential identifier to a record or list of revoked credential identifiers, or otherwise or assign the credential identifier a revoked status.

At step 416, when a user mobile device 102b subsequently attempts to access the lock device 104 using, at least in part, the revoked credential identifier, and the lock device 104 decrypts the payload and determines that the credential identifier is for that particular lock device 104, the lock device 104 will check as to whether the credential identifier for that user mobile device 102b has been listed, designated and/or recorded by the lock device 104 as having a revoked status. For example, according to certain embodiments, the lock device 104 may access a listing of revoked credential identifiers that are stored by the lock device 104 such as, for example, in the memory 122 of the lock device 104, and determine whether the credential identifier being presented is on a record or list of revoked credential identifiers. If the lock device 104 recognizes that the credential identifier being presented is a revoked credential identifier, then at step 418 the lock device 104 will deny the mobile device 102 access to the lock device 104. Additionally, at step 420 the lock device 104 may transmit a command to the application 136 on the user mobile device 102b to remove the credential identifier. At step 422, the application 136 may proceed with removing the credential identifier from user mobile device 102b. The application 136 on the user mobile device 102b may also generate a notification that the user mobile device 102b transmits to notify the access control system 106 and/or the application 136 on the administrative mobile device 102a that the credential identifier has been removed from the user mobile device 102b.

Figure 5:
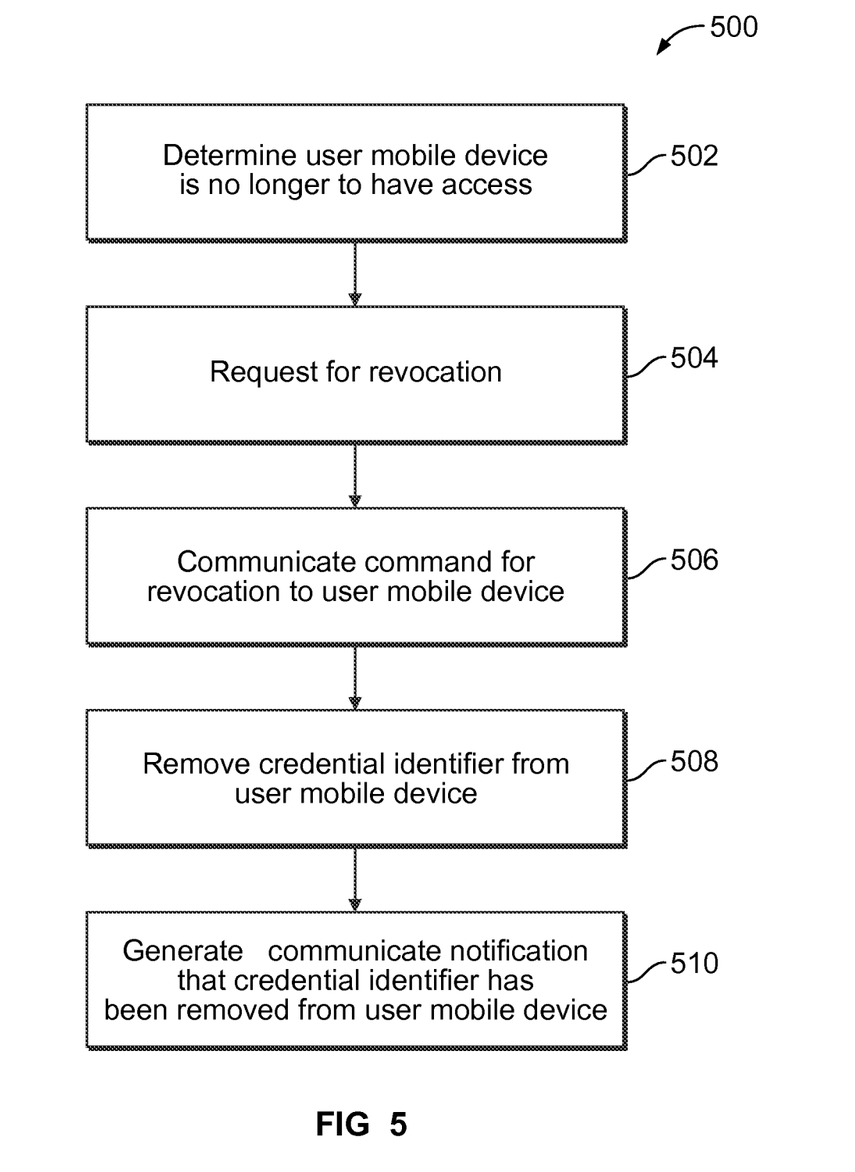
FIG. 5 illustrates a flow diagram of an exemplary process for automatically revoking a credential identifier(s) for user mobile devices according to an illustrated embodiment of the present invention.

FIG. 5 illustrates a flow diagram of an exemplary process 500 for automatically revoking a credential identifier(s) for user mobile devices 102b according to an illustrated embodiment of the present invention. At step 502, the administrative mobile device 102a may make a determination, or otherwise be instructed, that the user mobile device 102b is to no longer be allowed access to the lock device 104. At step 504, a request for revocation of the current credential identifier for the user mobile device 102b is generated. The request for revocation may be generated in a number of different ways. For example, according to certain embodiments, the request may be generated through use of the application on the administrative mobile device 102a, or via a web portal connection to the access control system 106.

At step 506, a command for revocation of the credential identifier of the user mobile device 102b is communicated to the user mobile device 102b. According to certain embodiments, the revocation command may be generated and communicated to the user mobile device 102b by the access control system 106, the administrative mobile device 102a, or a combination thereof. According to certain embodiments, the revocation command may be sent to an email address(es) or telephone number(s) associated with the user mobile device 102b.

At step 508, upon receiving the revocation command, the application 136 on the user mobile device 102b may remove the credential identifier from the user mobile device 102b. For example, according to certain embodiments, the application 136 on the user mobile device 102b may permanently remove the credential identifier from the user mobile device 102b. At step 510, the application 136 on the user mobile device 102b may then generate a communication that is provided to the access control system 106 and/or the administrative mobile device 102a that provides notification or verification that the credential identifier(s) has been removed from the user mobile device 102b. Such a notification may be sent to the access control system 106 at various time periods including, for example, upon completion of the removal of the credential identifier from the user mobile device 102b, and/or upon the occurrence of the first opportunity for the notification to be transmitted. For example, if the user mobile device 102b is powered-off before the notification is sent, then the notification may be transmitted when the user mobile device 102b is powered back on.

Upon removal of the credential identifier(s), if the user mobile device 102b attempts to communicate with the lock device 104, the user mobile device 102b may be unable to communicate payload information that the lock device 104 will be expecting. Accordingly, the user mobile device 102b may either receive a denied response from the lock device 104, or the connection will time out.

According to certain embodiments, the exemplary manual and automatic processes 400, 500 discussed above for revoking credential identifiers may be run in parallel or in series. For example, according to certain embodiments, the manual process 400 may be used if the automatic process 500 is unable to result in the revocation of credential identifiers, or vice versa. According to other embodiments, both the manual and automatic processes 400, 500 may be used in parallel as a further attempt to prevent breaches in security.

Figure 6:
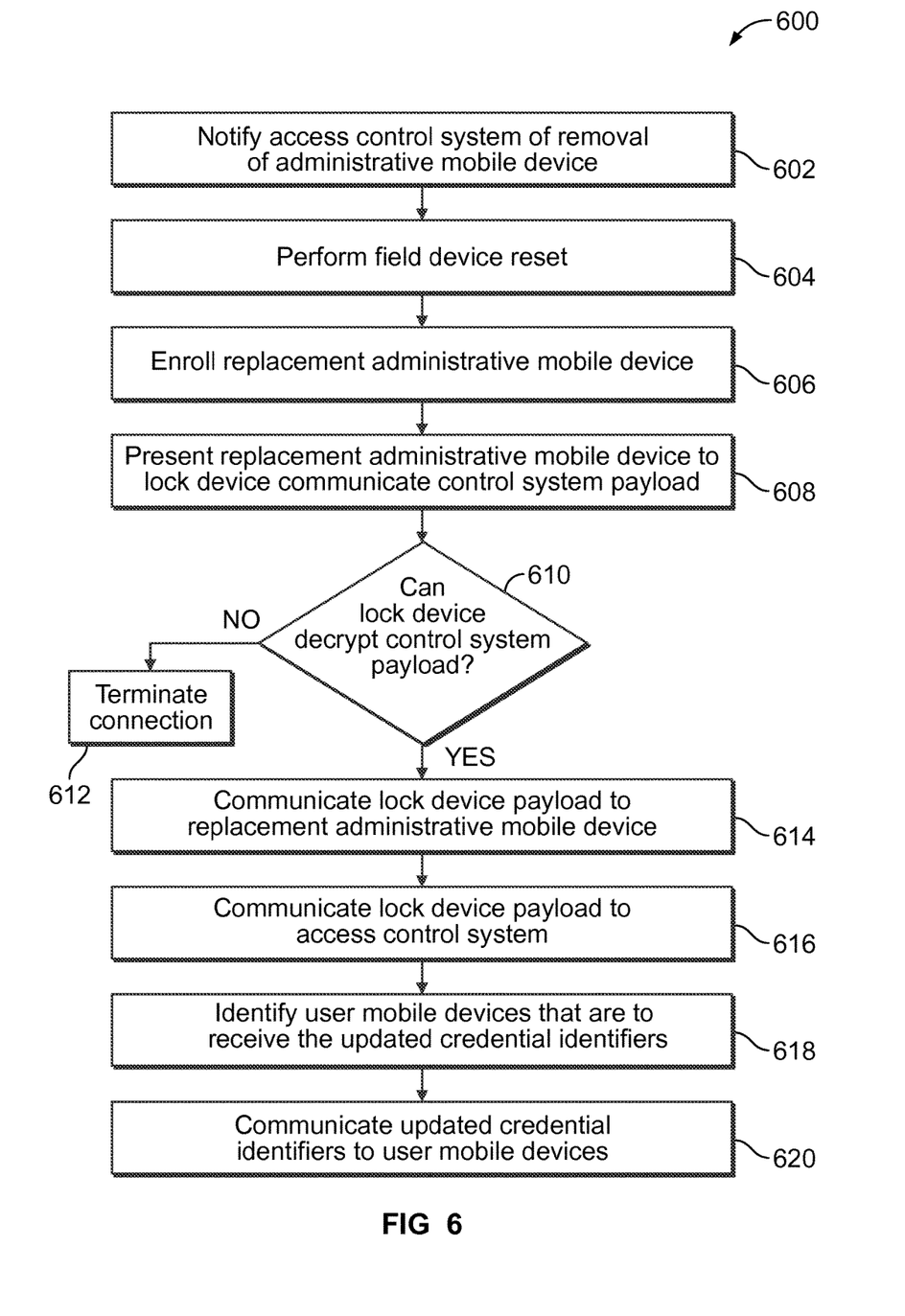
FIG. 6 illustrates a flow diagram of an exemplary process for removing an administrative mobile device from an enrolled lock device according to an illustrated embodiment of the present invention.

FIG. 6 illustrates a flow diagram of an exemplary process 600 for removing an administrative mobile device 102a from an enrolled lock device 104 according to an illustrated embodiment of the present invention. According to certain embodiments, a field device reset may be performed on the lock device(s) 104, which may in turn allow for a change as to which mobile device 102 is to be the administrative mobile device 102a that is enrolled with the lock device 104. Further, the use of field device reset may allow for a changing of which mobile devices 102 are an administrative mobile device 102a without requiring the presence of the existing administrative mobile device 102a, thereby allowing for such changes in the event that the current administrative mobile device 102a is lost or otherwise inoperable. Additionally, when a field device reset is performed, the field device reset identifier is modified in a known way, and any previously stored credential identifier(s) may be removed from the lock device 104.

The field device reset and designation of another mobile device 102 as the administrative mobile device 102c, as shown in FIG. 1, may be performed in a number of different ways. For example, according to the illustrated embodiment, at step 602 the access control system 106 may be notified that that an administrative mobile device 102a is being removed from the system 100 such as, for example, due to the administrative mobile device 102a being lost or inoperable. At step 604, a field device reset may be performed such as, for example, at the lock device 104, which may then remove credential identifiers from the lock device 104 and modify the field device reset identifier. Accordingly, the lock device 104 may not be operable via the user mobile device 102b as the new field device reset identifier of the lock device 104 may not match, or be similar to, a credential identifier(s) stored on the user mobile device 102b. For at least similar reasons, in the event the lost or inoperable administrative mobile device 102a becomes usable, that administrative mobile device 102a may also be unable to be used with the lock device 104.

At step 606, the mobile device 102 that is to become the replacement administrative mobile device 102c is connected to and enrolled with the access control system 106, and subsequently is associated with being an administrative mobile device 102c. According to certain embodiments, the process for enrolling the replacement administrative mobile device 102c may be similar to exemplary process 200 discussed above with respect to FIG. 2A. At step 608, the replacement administrative mobile device 102c may be presented to the lock device 104, and may communicate a replacement control system payload that has been encrypted by a replacement administrative mobile device diversification key that was generated using the master key, a replacement administrative mobile device identifier, and the diversification algorithm.

At step 610, using the master key contained in the memory 122 and the replacement administrative mobile device identifier, the lock device 104 will attempt to decrypt the received replacement control system payload. If the lock device 104 is unable to decrypt the control system payload, then at step 612 the connection between the lock device 104 and the replacement administrative mobile device 102c is terminated. However, if the lock device 104 is able to decrypt the replacement control system payload, then at step 614 the lock device 104 communicates a lock device payload to the replacement administrative mobile device 102c, which is subsequently received by replacement administrative mobile device 102c. The lock device payload may again include a variety of information such as, for example, a replacement field device reset identifier and one or more lock device identifiers. Additionally, the lock device payload may also be encrypted using the replacement administrative diversification key. According to certain embodiments, the replacement administrative mobile device 102c may then have control of the lock device via the access and configuration permissions provided by the access control system 106.

At step 616, the replacement administrative mobile device 102c may communicate the encrypted lock device payload to the access control system 106. According to certain embodiments, the access control system 106 may then acknowledge the update such as, for example, by communicating an update reply notification to the replacement administrative mobile device 102c and/or the lock device 104. At step 618, using the access control system 106, the user associated with the registered user account may indicate or identify which distributed credential identifiers are to be updated such as, for example, which user mobile devices 102b are to receive updated credential identifiers. At step 620, the access control system 106 may then communicate updated credential identifiers, which may include the updated field device reset identifier, to user mobile devices 102b that are registered or otherwise enrolled for use with the lock device(s) 104 and/or the particular lock device 104.

Various features and advantages of the present invention are set forth in the following claims. Additionally, changes and modifications to the described embodiments described herein will be apparent to those skilled in the art, and such changes and modifications can be made without departing from the spirit and scope of the present invention and without diminishing its intended advantages. While the present invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected. Further, the steps illustrated herein are understood to be exemplary only, and steps may be combined or divided, and added or removed, as well as re-ordered in whole or in part.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method for credential management, comprising:
   inputting a master key and an administrative mobile device identifier into a diversification algorithm to generate a diversification key, the administrative mobile device identifier including information that identifies a first administrative mobile device;
   encrypting, with the diversification key, a control system payload that includes at least one or more unique credential identifiers;
   communicating, by an access control system, the encrypted control system payload to the first administrative mobile device;
   receiving, by a lock device, the encrypted control system payload from the first administrative mobile device;
   retrieving, by the lock device, the master key from a memory of the lock device;
   decrypting, by the lock device, the encrypted control system payload using the retrieved master key and the administrative mobile device identifier;
   encrypting, by the lock device and using the diversification key, a lock device payload that includes at least one lock device identifier and a field device reset identifier;
   communicating, by the lock device, the encrypted lock device payload to the first administrative mobile device;
   receiving, by the access control system, the encrypted lock device payload from the first administrative mobile device; and
   decrypting, by the access control system, the encrypted lock device payload using the master key and the administrative mobile device identifier.

2. The method of claim 1, further comprising recording, by the access control system, at least a portion of the information extracted from the encrypted lock device payload in association with at least one of a user account or the lock device.

3. The method of claim 1, further comprising placing the lock device in an enrollment mode in response to the first administrative mobile device receiving the encrypted control system payload and prior to the lock device receiving the encrypted control system payload.

4. A method for managing a system, comprising:
   receiving, by an access control system, a mobile device identifier from a mobile device;
   applying the mobile device identifier and a master key to a diversification algorithm to generate a diversification key;
   encrypting, by the access control system and using the diversification key, a mobile device payload that includes a credential identifier and a field device reset identifier, the credential identifier including information regarding a permission level of the mobile device;
   communicating, by the access control system, the encrypted mobile device payload to the mobile device;
   receiving, by a lock device, the encrypted mobile device payload from the mobile device;
   decrypting, by the lock device, the encrypted mobile device payload;
   extracting, by the lock device, the credential identifier from the decrypted encrypted mobile device payload;
   identifying, by the lock device, the permission level of the mobile device using the extracted credential identifier; and
   determining, by the lock device and based on the identified permission level, whether the mobile device has authority to complete an action.

5. The method of claim 4, further comprising:
   communicating, from the access control system, an invitation to the mobile device to join the system; and
   communicating, from the access control system, in response to the acceptance of the invitation to join the system, an application for installation on the mobile device.

6. The method of claim 4, further comprising:
   extracting, by the lock device, the field device reset identifier from the decrypted encrypted mobile device payload;
   comparing, by the lock device, the extracted field device reset identifier to a field device reset identifier stored by the lock device; and
   terminating a connection between the mobile device and the lock device if the comparing indicates that the extracted field device reset identifier does not correspond with the field device reset identifier stored by the lock device.

7. The method of claim 4, further comprising:
   receiving, by a lock device, an encrypted revocation response payload, the encrypted revocation response payload identifying the credential identifier of the mobile device that is to be revoked;
   decrypting, by the lock device, the encrypted revocation response payload;
   extracting, by the lock device, the credential identifier of the mobile device that is to be revoked from the decrypted encrypted revocation response payload;
   identifying, by the lock device, the extracted credential identifier of the mobile device that is to be revoked as being a revoked identifier;

receiving, by the lock device, a subsequent communication from the mobile device that includes a credential identifier; and identifying, by the lock device, whether the received credential identifier included in the subsequent communication is the revoked identifier.

8. The method of claim 7, further comprising terminating, by the lock device, a connection between the lock device and the mobile device if the identifying step indicates that the credential identifier included in the subsequent communication is the revoked identifier.

9. The method of claim 7, further comprising communicating, by the lock device, a demand that the mobile device remove the revoked identifier.

10. The method of claim 7, further comprising:
identifying to the access control system the mobile device for which the credential identifier is to be revoked, and
communicating, by the access control system, a revocation request to the mobile device, the revocation request requesting that the credential identifier be removed from the mobile device.

11. The method of claim 4, further comprising:
communicating, by the access control system, a revocation request to the mobile device, the revocation request requesting that the credential identifier be removed from the mobile device; and
receiving, by the access control system, a notification that the credential identifier has been removed from the mobile device.

12. The method of claim 1, further comprising:
notifying an access control system that the first administrative mobile device is being removed from the access control system;
enrolling a replacement administrative mobile device with the access control system;
performing a field device reset on the lock device to automatically modify the field device reset identifier stored on the lock device and to remove all credential identifiers stored on the lock device;
receiving, by the access control system, a second encrypted lock device payload, the second encrypted lock device payload including a replacement field device reset identifier;
extracting, by the access control system, from the second encrypted lock device payload the replacement field device reset identifier; and
communicating, from the access control system, the extracted replacement field device reset identifier to one or more user mobile devices that are to be used with the lock device.

13. The method of claim 12, further comprising:
generating, by the access control system, a replacement administrative mobile device payload, the replacement administrative mobile device payload including a replacement administrative mobile device identifier;

encrypting the replacement administrative mobile device payload using a replacement administrative mobile device diversification key, the replacement administrative mobile device diversification key being generated using a master key, the replacement administrative mobile device identifier, and the diversification algorithm; and receiving, by the enrolled lock device, the encrypted replacement administrative mobile device payload.

14. The method of claim 13, further comprising one of:
decrypting, by the lock device, the encrypted replacement administrative mobile device payload using at least the master key and the replacement administrative mobile device identifier; and
terminating a connection between the lock device and the replacement administrative mobile device if the lock device is unable to decrypt the encrypted replacement administrative mobile device payload using at least the master key and the replacement administrative mobile device identifier.

15. The method of claim 1, further comprising registering, by the access control system, the field device reset identifier in association with the lock device in response to decrypting the encrypted lock device payload.

16. The method of claim 4, further comprising performing a field device reset on the lock device to automatically modify the field device reset identifier stored on the lock device and to remove all credential identifiers stored on the lock device; and
wherein the lock device is inoperable with the mobile device using the field device reset identifier extracted from the mobile device payload in response to performing the field device reset on the lock device.

17. The method of claim 12, wherein performing the field device reset on the lock device comprises performing the field device reset on the lock device to automatically modify the field device reset identifier stored on the lock device and to remove all credential identifiers stored on the lock device without interacting with the first administrative mobile device.

18. The method of claim 12, wherein performing the field device reset on the lock device comprises performing the field device reset on the lock device to automatically modify the field device reset identifier stored on the lock device and to remove all credential identifiers stored on the lock device in response to a determination that the first administrative mobile device has been lost or stolen.

19. The method of claim 3, wherein placing the lock device in the enrollment mode comprises processing, by the lock device, an enrollment credential received by a card reader associated with the lock device.

20. The method of claim 3, wherein placing the lock device in the enrollment mode comprises processing, by the lock device, a code entered into a keypad associated with the lock device.

* * * * *